(12) United States Patent
Manders

(10) Patent No.: US 6,343,833 B1
(45) Date of Patent: Feb. 5, 2002

(54) OPEN ROOF CONSTRUCTION FOR A VEHICLE

(75) Inventor: Peter Christiaan Leonardus Johannes Manders, Horst (NL)

(73) Assignee: Inalfa Industries B.V. (NL)

( * ) Notice: Subject to any disclaimer, the term of this patent is extended or adjusted under 35 U.S.C. 154(b) by 0 days.

(21) Appl. No.: 09/616,559

(22) Filed: Jul. 14, 2000

(30) Foreign Application Priority Data

Jul. 20, 1999 (NL) .............................................. 1012647

(51) Int. Cl.$^7$ .............................. B60J 7/05; B60J 7/057
(52) U.S. Cl. ....................................... 296/223; 296/221
(58) Field of Search ................................. 296/221–224

(56) References Cited

U.S. PATENT DOCUMENTS

| | | | |
|---|---|---|---|
| 4,417,763 A | 11/1983 | Schlapp et al. | 296/216 |
| 4,619,480 A | 10/1986 | Motoyama et al. | 296/217 |
| 4,647,104 A | 3/1987 | Kohlpaintner et al. | 296/221 |
| 4,671,565 A | 6/1987 | Grimm et al. | 296/216 |
| 4,684,169 A | 8/1987 | Igel et al. | 296/221 |
| 4,725,092 A | 2/1988 | Reintges et al. | 296/221 |
| 4,752,099 A | 6/1988 | Roos et al. | 296/223 |
| 4,877,285 A | 10/1989 | Huyer | 296/216 |
| 5,020,849 A | 6/1991 | Schlapp et al. | 296/221 |
| 5,058,947 A | * 10/1991 | Huyer | 296/223 X |
| 5,066,068 A | 11/1991 | Suzuki et al. | 296/221 |
| 5,259,662 A | 11/1993 | Huyer | 296/221 |
| 5,527,085 A | 6/1996 | Ochiai et al. | 296/223 |
| 5,593,204 A | 1/1997 | Wahl et al. | 296/223 |
| 5,845,959 A | 12/1998 | Ueki | 296/221 |
| 6,164,178 A | 12/2000 | Stallfort | 296/222 |

FOREIGN PATENT DOCUMENTS

| | | | |
|---|---|---|---|
| DE | 3442600 | 5/1986 | |
| DE | 3603314 A1 | 6/1987 | |
| DE | 3930756 | 3/1991 | |
| DE | 9116412 | 2/1993 | |
| DE | 44 05 742 | 5/1995 | |
| DE | 195 14 585 | 10/1996 | |
| EP | 0 033 816 | 8/1981 | |
| EP | 0143589 | * 6/1985 | ................. 296/223 |
| EP | 0 218 890 | 4/1987 | |

(List continued on next page.)

OTHER PUBLICATIONS

U.S. application No. 09/553,689 filed Apr. 21, 2000.
U.S. application No. 09/556,192 filed Apr. 21, 2000.
U.S. application No. 09/556,110 filed Apr. 21, 2000.
U.S. application No. 09/530,004 filed Apr. 21, 2000.
U.S. application No. 09/616,168 filed Jul. 14, 2000.
U.S. application No. 09/661,231 filed Sep. 13, 2000.
U.S. application No. 09/616,172 filed Jul. 14, 2000.
"The Woodworkers' Store", 1993–94 Catalog.

Primary Examiner—Dennis H. Pedder
(74) Attorney, Agent, or Firm—Westman, Champlin & Kelly, P.A.; S. Koehler

(57) ABSTRACT

An open roof construction for a vehicle having an opening in its fixed roof comprises a frame to be fixed to the roof and a closure element supported by the frame. Said closure element is adjustable between a closed position, in which it closes the roof opening, and an open position, in which it releases the roof opening at least partially. An operating mechanism for adjustably supporting said closure element includes a drivingly movable driving element and an arm connected thereto by means of a pivot, which arm engages the movable driving element asymmetrically and which effects an adjustment of the closure element by means of said driving element by moving said driving element. The driving element and the arm include mating contacting surfaces formed concentrically about the pivot, at least some of which extend substantially perpendicularly to the direction of movement during operation of the operating mechanism.

15 Claims, 7 Drawing Sheets

FOREIGN PATENT DOCUMENTS

| | | |
|---|---|---|
| EP | 0 343 750 | 11/1989 |
| EP | 0 517 318 A | 12/1992 |
| EP | 0 747 249 | 12/1996 |
| EP | 0 899 140 | 3/1999 |
| FR | 2 495 068 | 6/1982 |
| FR | 2 527 995 | 12/1983 |
| JP | 0278422 | 12/1986 |
| JP | 0104734 | 5/1991 |
| JP | 404297323 | 10/1992 |

* cited by examiner

OPEN ROOF CONSTRUCTION FOR A VEHICLE

BACKGROUND OF THE INVENTION

The invention relates to an open roof construction for a vehicle having an opening in its fixed roof, comprising a stationary part to be fixed to the roof, an adjustable closure element supported by said stationary part, which is adjustable between a closed position, in which it closes the roof opening, and an open position, in which it releases the roof opening at least partially. An operating mechanism adjustably supports the closure element. The operating mechanism includes a drivingly movable driving element and an arm connected thereto by means of a pivot. The arm engages the movable element asymmetrically and which effects an adjustment of the closure element by means of said driving element by moving said driving element.

Open roof constructions of this kind are known in various versions thereof.

The object of the present invention is to provide an open roof construction, which embodies an improved construction of a pivot between a pivoted arm and a driving element.

SUMMARY OF THE INVENTION

The invention provides a hinge construction between an arm and a driving part of an operating mechanism of an open roof construction which is remarkable for being rattle-free and resistant to wear, whilst the pivot is of very simple construction all the same and very easy to mount.

BRIEF DESCRIPTION OF THE DRAWINGS

The invention will now be explained in more detail with reference to the drawings, which schematically show an exemplary embodiment of the invention.

DETAILED DESCRIPTION OF THE ILLUSTRATIVE EMBODIMENTS

Figure 1:
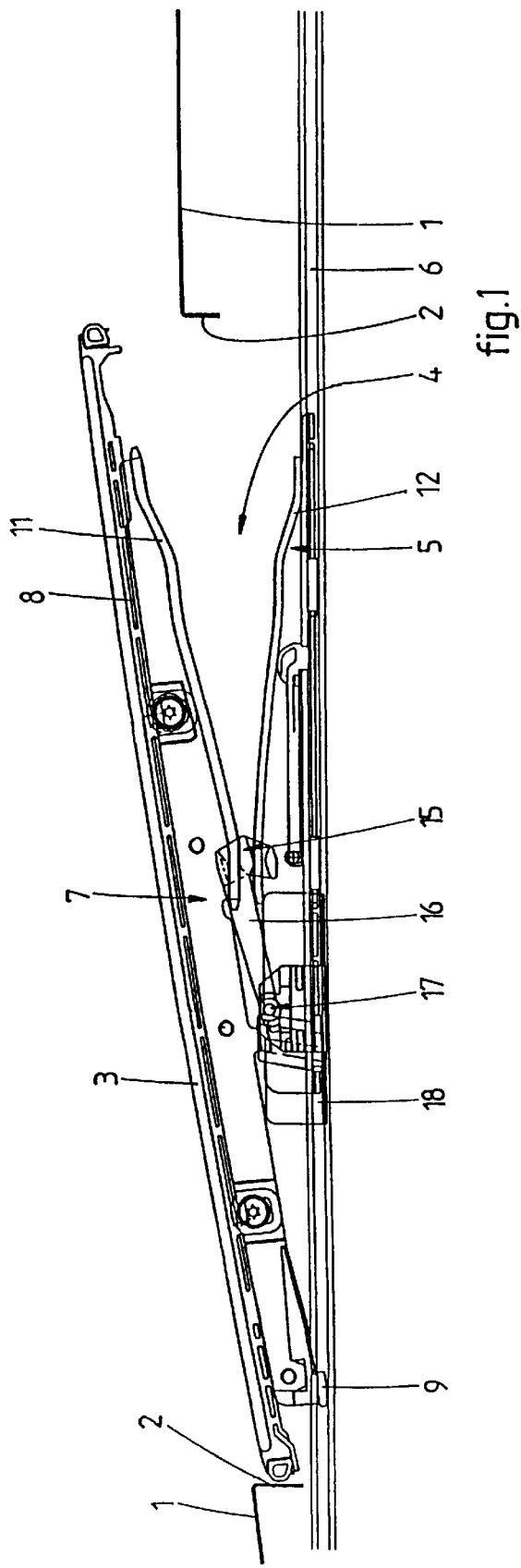
FIG. 1 is a longitudinal sectional view of the embodiment of the open roof construction according to the invention, showing the closure element in an open ventilating position.

The open roof construction as shown in the drawings constitutes the subject matter of further co-pending patent applications both entitled "Open Roof Construction for a Vehicle" (identifiable by Ser. No. 09/616,168 and Ser. No. 09/616,172 filed on even date herewith, the contents of which are incorporated herein by reference.

Figure 2:
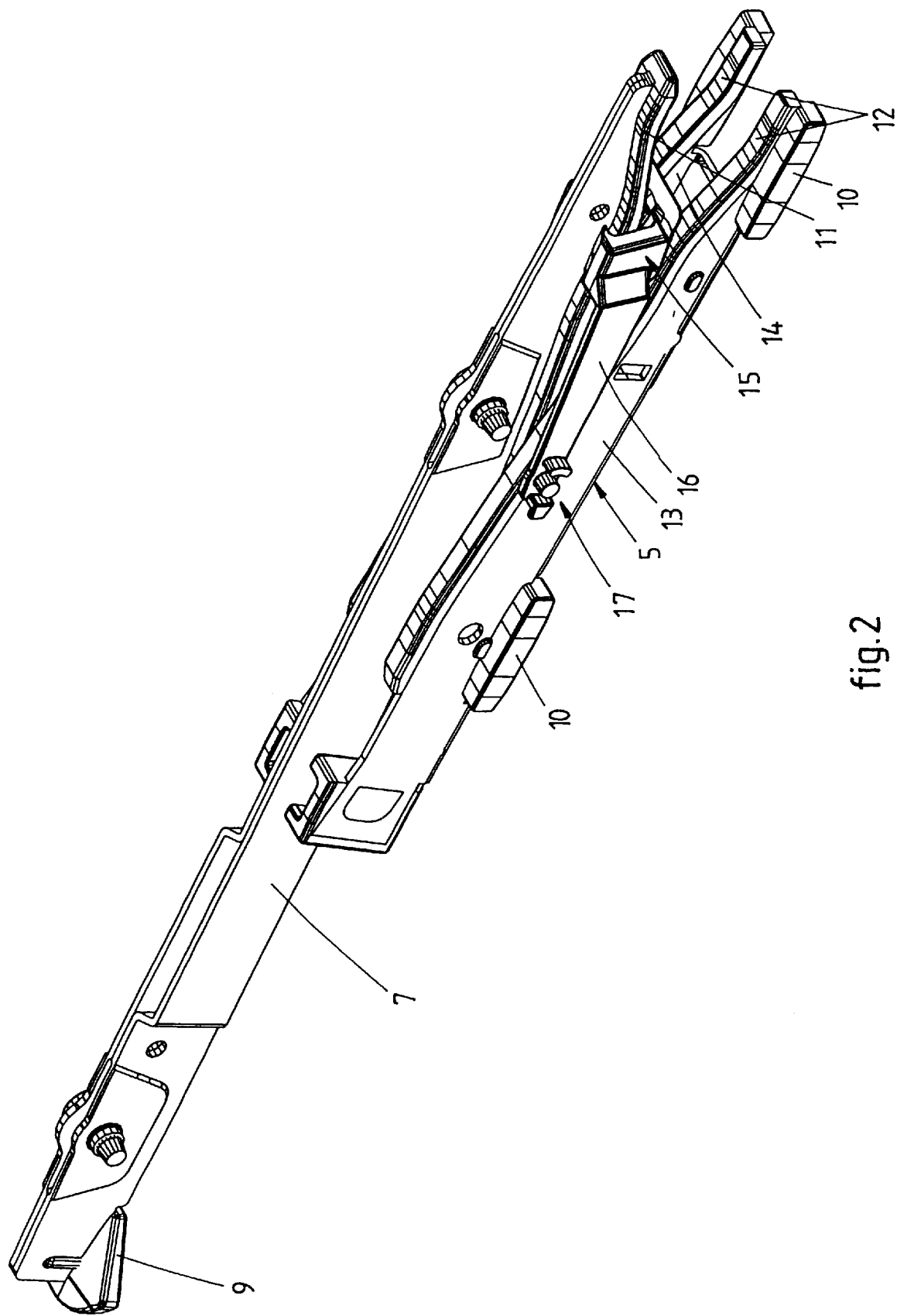
FIG. 2 is a larger-scale perspective view of an operating mechanism on one side of the open roof construction of FIG. 1, showing the closure element in the closed position.
Figure 3:
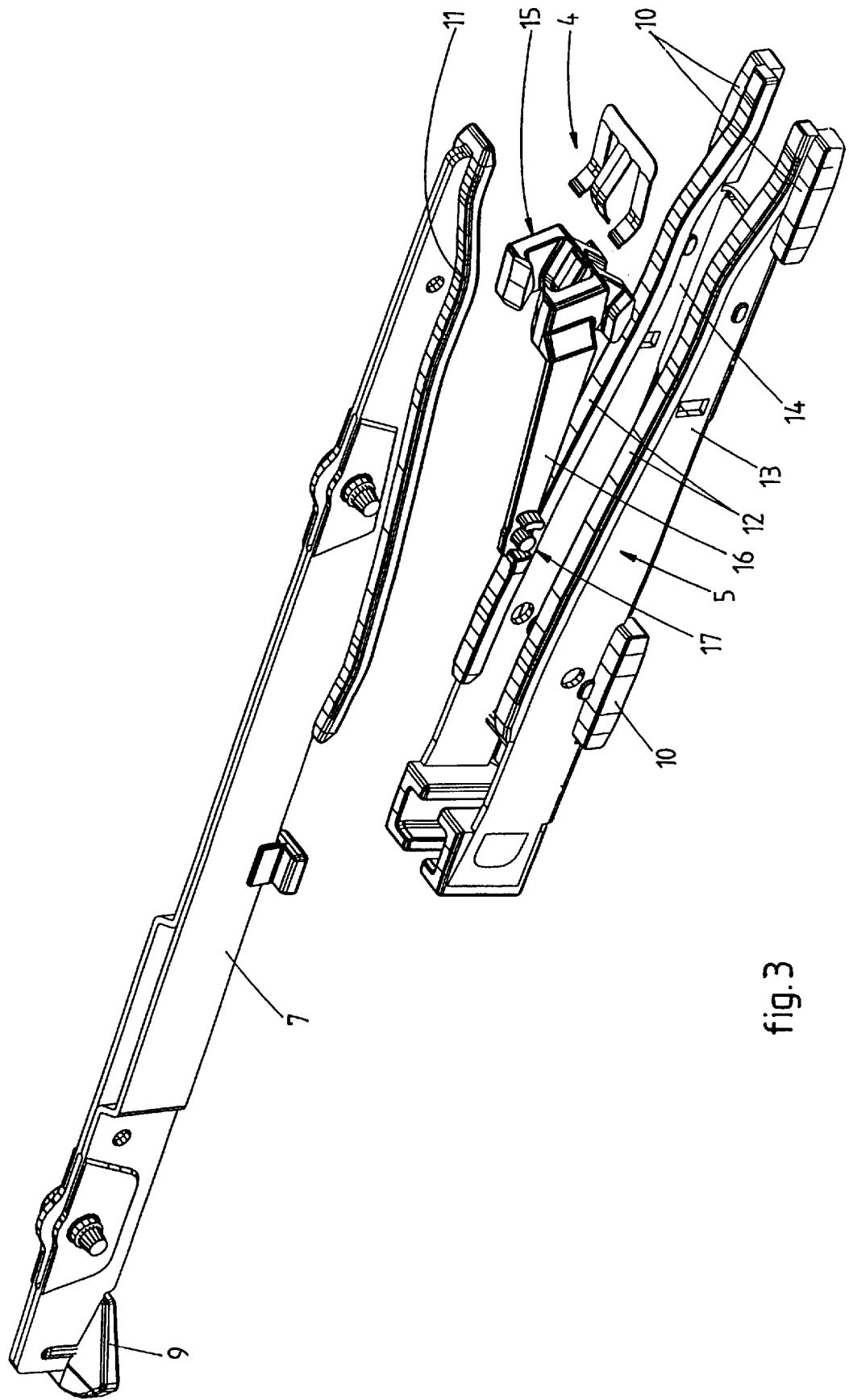
FIG. 3 is a perspective, exploded view of the operating mechanism of FIG. 2.

The drawings show a fixed roof 1 of a vehicle, such as a passenger car, which is provided with a roof opening 2 for receiving an open roof construction. The open roof construction includes a closure element 3 for selectively closing or at least partially releasing the roof opening 2. In this embodiment the closure element 3 is a rigid panel, in particular a transparent panel of glass or plastic material, but also other closure elements such as slats or a flexible cover are conceivable. In the illustrated embodiment a sliding-tilt roof is used, wherein panel 3 can be moved from the closed position in roof opening 2 (FIGS. 2, 3), on the one hand to an upwardly and rearwardly sloping ventilating position (FIG. 1) and on the other hand downwards (FIG. 5) and subsequently rearwards to a position under the fixed roof 1. Other embodiments are possible, however.

In order to enable the movements of panel 3, panel 3 is fitted with an operating mechanism 4 at both edges extending in the longitudinal direction of the open roof construction. In this embodiment, each operating mechanism 4 includes a link slide 5, which is slidably accommodated in a guideway of a guide rail 6. Said guide rail 6 is mounted on or forms part of a stationary part (not shown), for example a frame, which is attached to the fixed roof 1 of the vehicle. The guide rails 6 extend along the longitudinally extending edges of the roof opening 2 and possibly rearwards thereof.

Part of the operating mechanism 4 is made up of a link 7, which is attached to the underside of panel 3, near the respective longitudinal edge. The link 7 can include a stiffening frame 8. At its front end, link 7 is fitted with a sliding shoe 9, which is slidably accommodated in associated grooves in guide rail 6, and which also functions as the front hinge for panel 3. Link slide 5 comprises two pairs of sliding shoes 10, which project laterally and which guide link slide 5 in guide rail 6.

Both link slide 5 and link 7 include guideways in the form of laterally projecting ribs 11, 12, wherein ribs 11 are formed on the lower edge of link 7 and extend away from each other, whilst ribs 12 are formed on the upper side of vertical walls 13, 14 of the link slide 5 and extend towards each other. A guide head 15 is in engagement with all ribs 11 and 12, and to that end it engages between the vertical walls 13, 14 of link slide 5 and around link 7.

Figure 4:
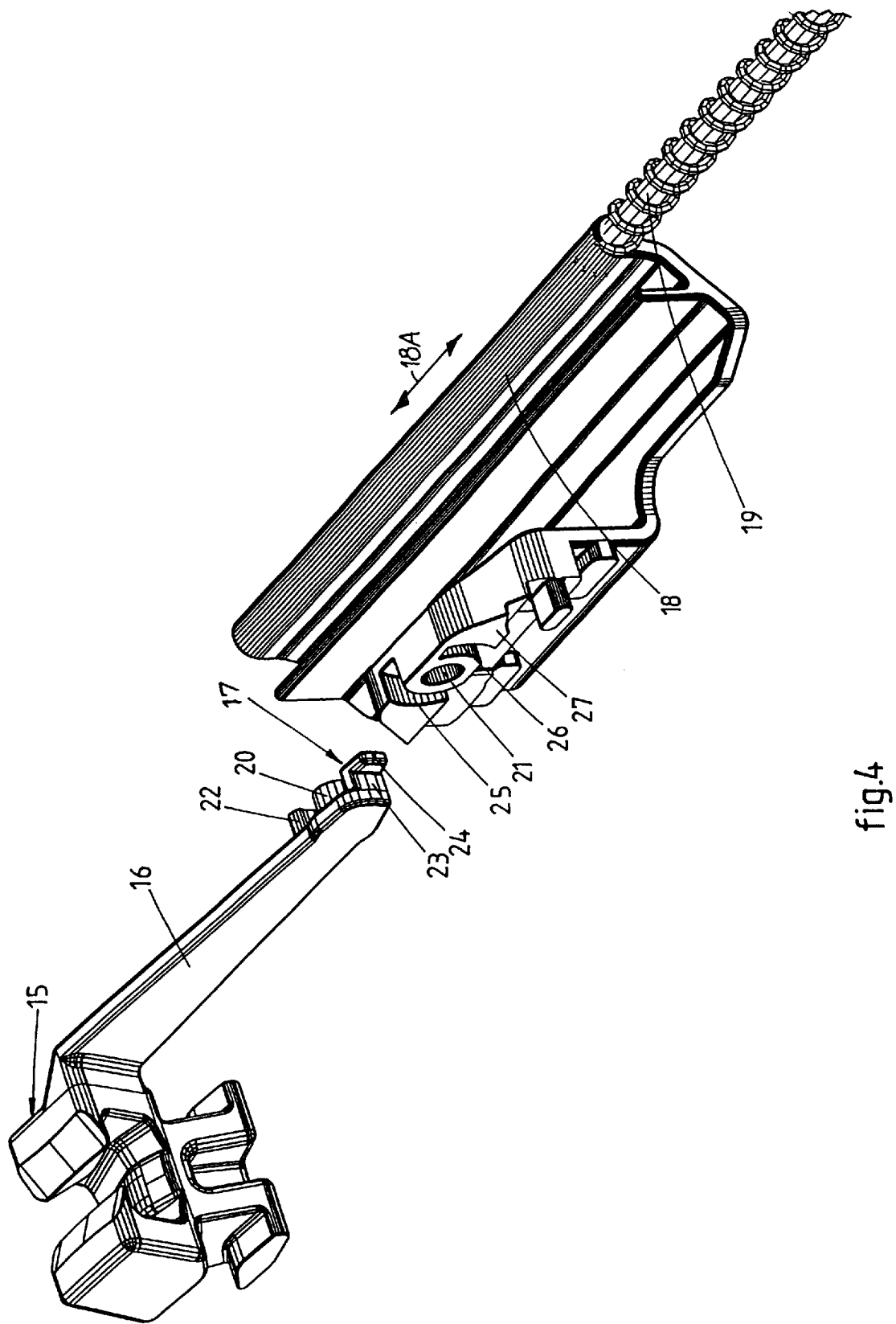
FIGS. 4, 5 and 6 are larger-scale perspective views of the driving slide and the associated arm of the operating mechanism of FIGS. 2 and 3.
Figure 5:
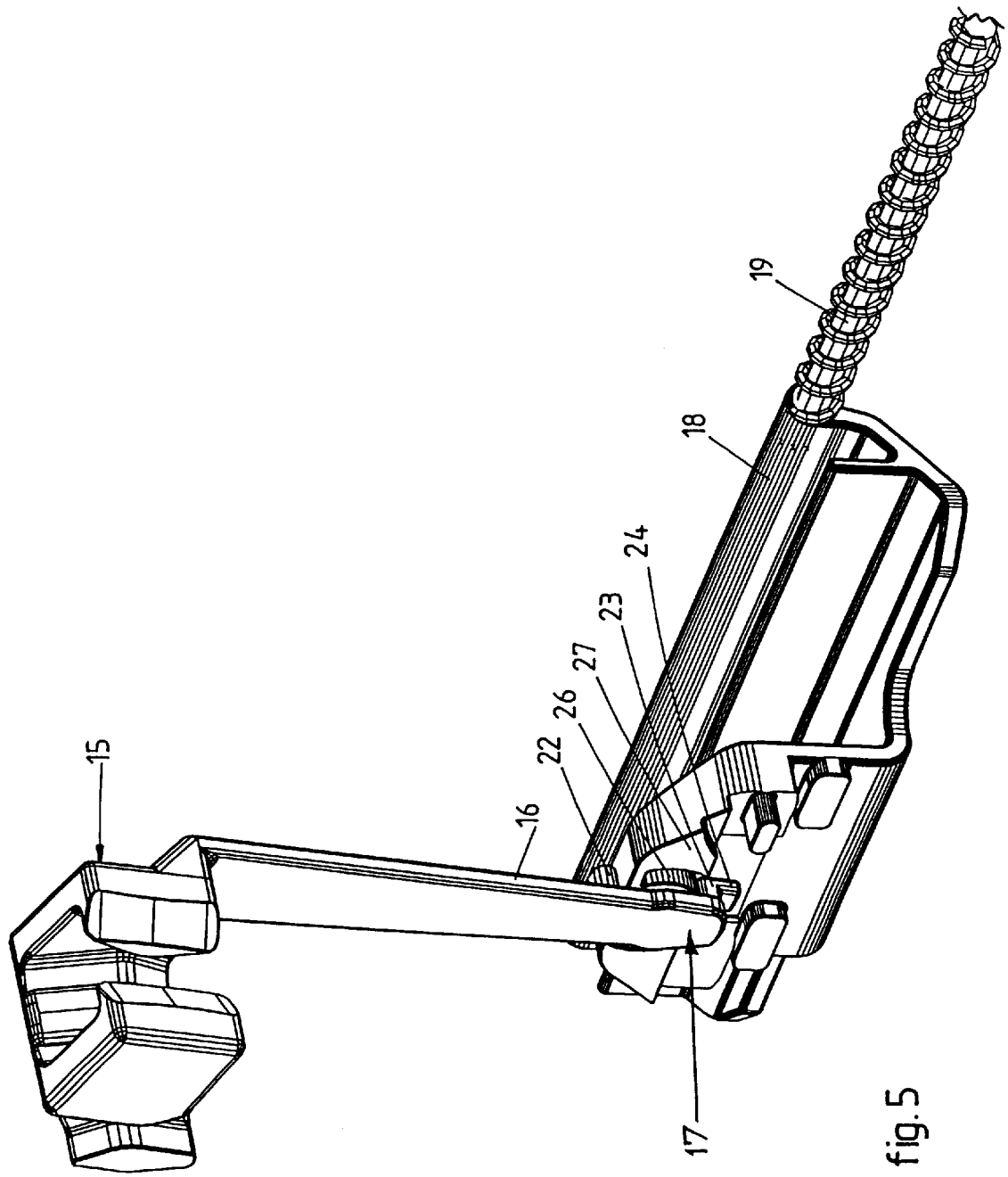
Figure 6:
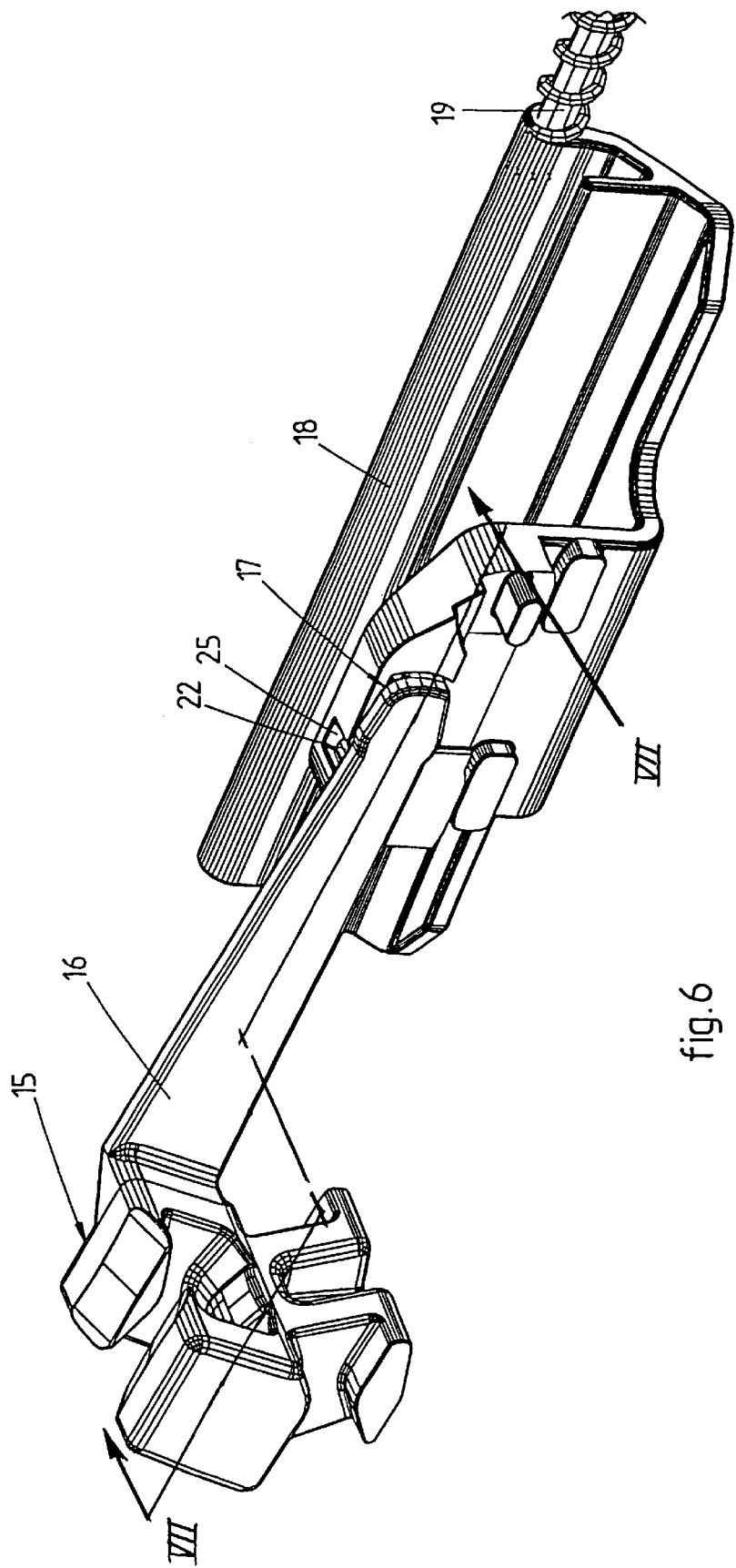

As is shown in particular in FIGS. 4–6, guide head 15 is formed unilaterally, and consequently asymmetrically, on a free end of an arm 16. On its end remote from guide head 15, arm 16 is pivotally connected, via a pivot 17, to a driving slide 18 (see also FIG. 1), which is drivingly connected to a drive unit, such as an electric motor, a hand crank or the like, via a pressure-rigid driving cable 19 or the like. By moving the guide head 15, which acts as a wedge between link slide 5 and link 7, with respect to guideways 11, 12, link 7 and thus panel 3 will be pivoted about pivot 9. Link slide 5 is stationary during said pivoting of panel 3. In the lower pivoted position of panel 3 the driving slide 18 is locked in position with respect to link slide 5, after which the entire operating mechanism 4 and panel 3 will move rearwards as one unit upon further rearward movement of the driving slide 18. The specific operation of driving slide 18 and link slide 5 is not necessary for practicing the present invention although these features are described in detail in co-pending applications entitled "Open Roof Construction for a Vehicle", filed Apr. 21, 2000 and assigned Ser. Nos. 09/556,110 and 09/553,689, and 09/556,192, the contents of which are hereby incorporated by reference in their entirety.

The construction of pivot 17 is clearly shown in FIGS. 4–6. Pivot 17 comprises a pin 20, which extends horizontally, in a transverse direction to guide rail 6, at the end of arm 16 remote from guide head 15. Pin 20 can be inserted in an axial direction into a hole 21 of driving slide 18. A first projection 22 and a second projection 23 are concentrically disposed about pin 20 on arm 16. The second projection 23 is formed on the end of arm 16, it furthermore comprises a further projection 24, which extends transversely to second projection 23, and which is parallel to arm 16 and, in a mounted position, is parallel to guide rail 6 and the sliding movement of driving slide 18 as indicated by arrow 18A (FIG. 5).

In the mounted position of pivot 17 in driving slide 18, projections 22"24 can mate with associated recesses, specifically a first recess 25 for first projection 22 and a second recess 26 for second projection 23 and said further projection 24. The first projection 22 and the second projection 25 are both formed about hole 21 of pivot in the form of a partial circular segment, with the first recess 25 being open at each end on upper and lower sides. First projection 22 and first recess 25 have mating contacting surfaces, which extend substantially perpendicularly to the direction of movement of driving slide 18, and which are consequently capable of absorbing driving forces from driving slide 18 on arm 16.

Figure 7:
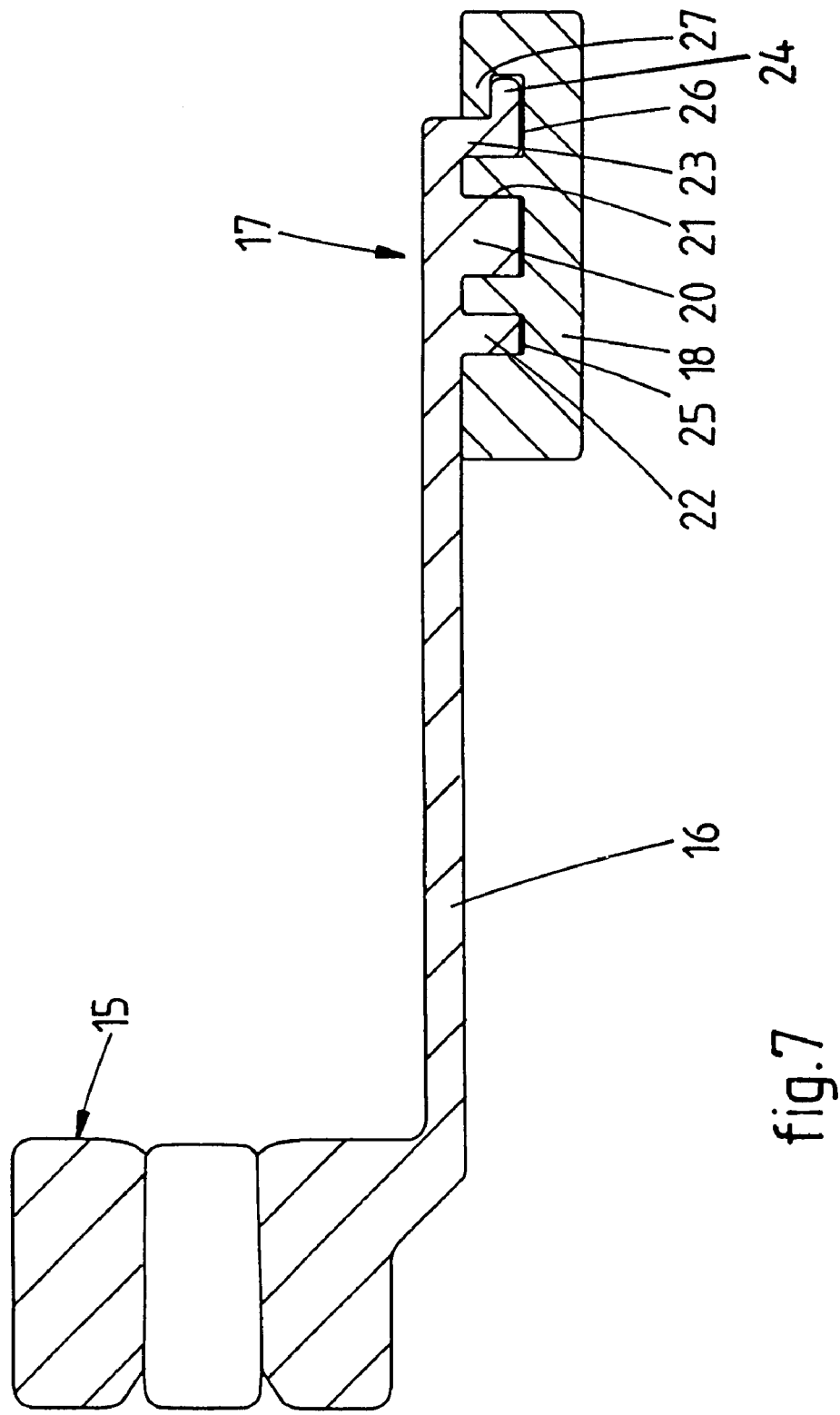
FIG. 7 is a sectional view along line VII—VII in FIG. 6.

Second projection 23 and second recess 26 possess corresponding contacting surfaces, which likewise extend concentrically about pivot 17. In a mounted condition, further projection 24 mates with a further wall 27 which closes part of second recess 26, as a result of which said further projection 24 and said further wall 27 can function to lock pin 20 in position in hole 21, in that further projection 24 and further wall 27 are in engagement within the normal pivoting range of arm 16, as is shown in FIGS. 6 and 7.

Second recess 26 is closed on the upper side and only open on the lower side, and as a result of the construction of further projection 24 and further wall 27, said second projection 23 and said further projection 24 can only be inserted into the second recess 26 by inserting pin 20 into hole 21 in the mounted position of arm 16 (FIG. 5), which lies outside the normal pivoting range of said arm 16 (FIG. 6). In this position, the stop surfaces of first projection 22 and first recess 25, as well as the stop surfaces of second projection 23 and further projection 24 with second recess 26 are not in engagement with each other. By pivoting arm 16 from this position to the normal operative position, wherein arm 16 includes a small angle with the horizontal or guide rail 6, the projections 22–24 and the associated recesses 25–26 will move into engagement with each other, and further projection 24 will move behind the further wall 27 of driving slide 18, as a result of which pin 20 is locked in position in hole 21, thus forming pivot 17.

In the mounted position as shown in FIG. 5, first projection 22 also functions as a stop against the upper side of driving slide 18, so that said driving slide 18 limits the extent of pivoting movement and determines when pin 20 can be withdrawn from hole 21.

Projections 22–24 are formed slightly larger than recesses 25, 26, as a result of which projections 22–24 will be received in recesses 25–26 with some friction, thus providing a connection which is free from play. Since the angular displacements of arm 16 during operation of the operating mechanism are only small, said friction will not have an adverse effect on the operation. Since arm 16 with guide head 15 is positioned asymmetrically with respect to pivot 17, moments will be exerted on pin 20 and hole 21, which can be absorbed by the contacting surfaces of projections 22–24 and recesses 25, 26. In this manner a very stable pivot 17 is provided, with projections 22–24 mainly having a guiding and force absorption function, whilst in addition further projection 24 performs a locking function, which ensures that the pivot 17 is easy to construct and that it can be locked in the operative position without additional parts being required.

The invention is not limited to the above-described embodiment as shown in the drawing, which can be varied in several ways without departing from the scope of the invention. Thus the driving element may include other movable parts, which are connected to an arm. The arm may for example also comprise a lever or the like. The locking surfaces for locking a pin axially in a hole so as to form a pivot can also be used in other parts of the open roof construction according to the invention.

What is claimed is:

1. An open roof construction for a vehicle having an opening in its fixed roof, comprising:
    a stationary part to be fixed to the roof;
    an adjustable closure element supported by said stationary part, which is adjustable between a closed position, in which it closes the roof opening, and an open position, in which it releases the roof opening at least partially; and
    an operating mechanism including a movable driving element and an arm connected thereto by a pivot, said pivot comprising a pin fitting in a hole, said pivot being disposed asymmetrically on the arm, the arm engaging the movable driving element asymmetrically to effect an adjustment of the closure element by moving said driving element, wherein the driving element and the arm include mating contacting surfaces, said contacting surfaces being in engagement with each other if said arm is within a normal pivoting range to effectuate opening and closing of the roof opening with the closure element, the contacting surfaces formed concentrically about the pivot, at least some of which extend substantially perpendicularly to a direction of movement of said driving element to absorb driving forces exerted by said driving element on said arm during operation of the operating mechanism.

2. The open roof construction according to claim 1, wherein said driving element and said arm also include further contacting surfaces that extend substantially parallel to the direction of movement to inhibit disconnection of the pivot in the normal pivoting range.

3. The open roof construction according to claim 1, wherein said contacting surfaces are formed on at least one projection and a recess in at least one of said driving element and said arm.

4. The open roof construction according to claim 2, wherein said projection is formed on said arm and wherein said recess is formed in said driving element.

5. The open roof construction according to claim 3, wherein two diametrically opposed projections are formed on said arm.

6. The open roof construction according to claim 1, wherein said pivot is formed of the pin on said arm, which is axially inserted into the hole, whilst said arm can be pivoted to a mounting position outside the normal pivoting range during the operation of the operating mechanism, and wherein said contacting surfaces are so positioned that they are in engagement with each other within the normal pivoting range of the arm and that they are out of engagement in the mounting position of the arm.

7. The open roof construction according to claim 2, wherein said further contacting surfaces are formed on a projection which is disposed at the end of the arm.

8. The open roof construction according to claim 1, wherein said driving element comprises a driving slide, whilst said arm supports a guide head at an end remote from the driving slide, wherein the guide head is in engagement with a first guideway on a link of the closure element, and wherein the guide head is also in engagement with a second guideway on a link slide coupled to the stationary part, wherein the adjustment of the closure element is effected by the wedge-like movement of the guide head along said guideways.

9. An open roof construction for a vehicle having an opening in its fixed roof, comprising:

a stationary part to be fixed to the roof;

an adjustable closure element supported by said stationary part, which is adjustable between a closed position, in which it closes the roof opening, and an open position, in which it releases the roof opening at least partially; and an operating mechanism including a movable driving element and an arm connected thereto by a pivot, the arm engaging the movable driving element asymmetrically to effect an adjustment of the closure element by moving said driving element, wherein said pivot comprises a pin which fits in a hole and which can be inserted into said hole in an axial direction, the pivot being disposed asymmetrically on the arm, and wherein said driving element and said arm include at least one projection and mating recess disposed concentrically about said pivot in at least one of said driving element and said arm and which include mating stop surfaces, which prevent removal of said pin from said hole in a pivoting range of the arm to effectuate opening and closing of the roof opening with the closure element.

10. An open roof construction for a vehicle having an opening in its fixed roof, comprising:

a stationary part to be fixed to the roof;

an adjustable closure element supported by said stationary part, which is adjustable between a closed position, in which it closes the roof opening, and an open position, in which it releases the roof opening at least partially; and an operating mechanism including a movable driving element and an arm connected thereto by a pivot, the arm engaging the movable driving element asymmetrically to effect an adjustment of the closure element by moving said driving element, wherein said pivot comprises a pin which fits in a hole and which can be inserted into said hole in an axial direction, wherein said driving element and said arm include stop surfaces, while said arm can be pivoted to a mounting position outside a normal pivoting range during the operation of the operating mechanism to effectuate opening and closing of the roof opening with the closure element, and wherein said stop surfaces are so positioned that they are in engagement with each other extending substantially parallel to the direction of movement of said movable driving element within the normal pivoting range of the arm, effecting an axial locking engagement of said pin in said hole, and that they are out of engagement in the mounting position of the arm, thereby allowing insertion and removal of the pin from the hole.

11. An open roof construction for a vehicle having an opening in its fixed roof, comprising:

a stationary part to be fixed to the roof;

an adjustable closure element supported by said stationary part, which is adjustable between a closed position, in which it closes the roof opening, and an open position, in which it releases the roof opening at least partially; and an operating mechanism including an element and an arm connected thereto by a pivot, the arm engaging the element asymmetrically to effect an adjustment of the closure element by moving said element, wherein said pivot comprises a pin which fits in a hole and which can be inserted into said hole in axial direction, wherein said element and said arm include stop surfaces which extend substantially perpendicularly to said pivot, while said arm can be pivoted to a mounting position outside a normal pivoting range during operation of the operating mechanism to effectuate opening and closing of the roof opening with the closure element, and wherein said stop surfaces are so positioned that they are in engagement with each other within the normal pivoting range of the arm, effecting an axial locking engagement of said pin in said hole, and that they are out of engagement in the mounting position of the arm, thereby allowing insertion and removal of the pin from the hole.

12. An open roof construction for a vehicle having an opening in its fixed roof, comprising:

a stationary part to be fixed to the roof;

an adjustable closure element supported by said stationary part, which is adjustable between a closed position, in which it closes the roof opening, and an open position, in which it releases the roof opening at least partially; and an operating mechanism including a movable driving element and an arm connected thereto by a pivot, the arm engaging the movable driving element asymmetrically to effect an adjustment of the closure element by moving said driving element, wherein the driving element and the arm include mating contacting surfaces formed concentrically about the pivot, the pivot comprising two diametrically opposed projections formed on said arm, and wherein at least some of the mating contracting surfaces extend substantially perpendicularly to a direction of movement of the driving element during operation of the operating mechanism and wherein said driving element and said arm also include further contacting surfaces that extend substantially parallel to the direction of movement of the driving element.

13. An open roof construction for a vehicle having an opening in its fixed roof, comprising:

a stationary part to be fixed to the roof;

an adjustable closure element supported by said stationary part, which is adjustable between a closed position, in which it closes the roof opening, and an open position, in which it releases the roof opening at least partially; and an operating mechanism including a movable driving element and an arm connected thereto by a pivot, the arm engaging the movable driving element asymmetrically to effect an adjustment of the closure element by moving said driving element, wherein the driving element and the arm include mating contacting surfaces formed concentrically about the pivot, at least some of which extend substantially perpendicularly to a direction of movement of the driving element during operation of the operating mechanism, and wherein said pivot is formed of a pin on said arm, which is axially inserted into a hole, wherein said arm can be pivoted to a mounting position outside a normal pivoting range during the operation of the operating mechanism to open and close the roof opening with the closure element, and wherein further contacting surfaces are so positioned that they are in engagement with each other within the normal pivoting range of the arm and that they are out of engagement in the mounting position of the arm.

14. An open roof construction for a vehicle having an opening in its fixed roof, comprising:

a stationary part to be fixed to the roof;

an adjustable closure element supported by said stationary part, which is adjustable between a closed position, in which it closes the roof opening, and an open position, in which it releases the roof opening at least partially; and an operating mechanism including a movable driving element and an arm connected thereto by a pivot, the arm engaging the movable driving element asymmetrically to effect an adjustment of the closure element by moving said driving element, wherein the driving element and the arm include mating contacting surfaces formed concentrically about the pivot, at least some of which extend substantially perpendicularly to a direction of movement of the driving element during operation of the operating mechanism, and wherein said driving element and said arm also include further contacting surfaces that extend substantially parallel to the direction of movement and said further contacting surfaces are formed on a projection which is disposed at the end of the arm.

15. An open roof construction for a vehicle having an opening in its fixed roof, comprising:

a stationary part to be fixed to the roof;

an adjustable closure element supported by said stationary part, which is adjustable between a closed position, in which it closes the roof opening, and an open position, in which it releases the roof opening at least partially;

an operating mechanism including a movable driving element and an arm connected thereto by a pivot, wherein said driving element comprises a driving slide, and said arm supports a guide head at an end remote from the driving slide, wherein the guide head is in engagement with a first guideway on a link of the closure element, and wherein the guide head is also in engagement with a second guideway on a link slide coupled to the stationary part, wherein the adjustment of the closure element is effected by wedge-like movement of the guide head along said guideways, the arm engaging the movable driving element asymmetrically to effect an adjustment of the closure element by moving said driving element, and wherein the driving element and the arm include mating contacting surfaces formed concentrically about the pivot, at least some of which extend substantially perpendicularly to a direction of movement of the driving element during operation of the operating mechanism.

\* \* \* \* \*